Dec. 28, 1954 K. M. UGLOW, JR., ET AL 2,698,382
ELECTRONIC SWITCHING METHOD
Filed March 30, 1951 3 Sheets-Sheet 1
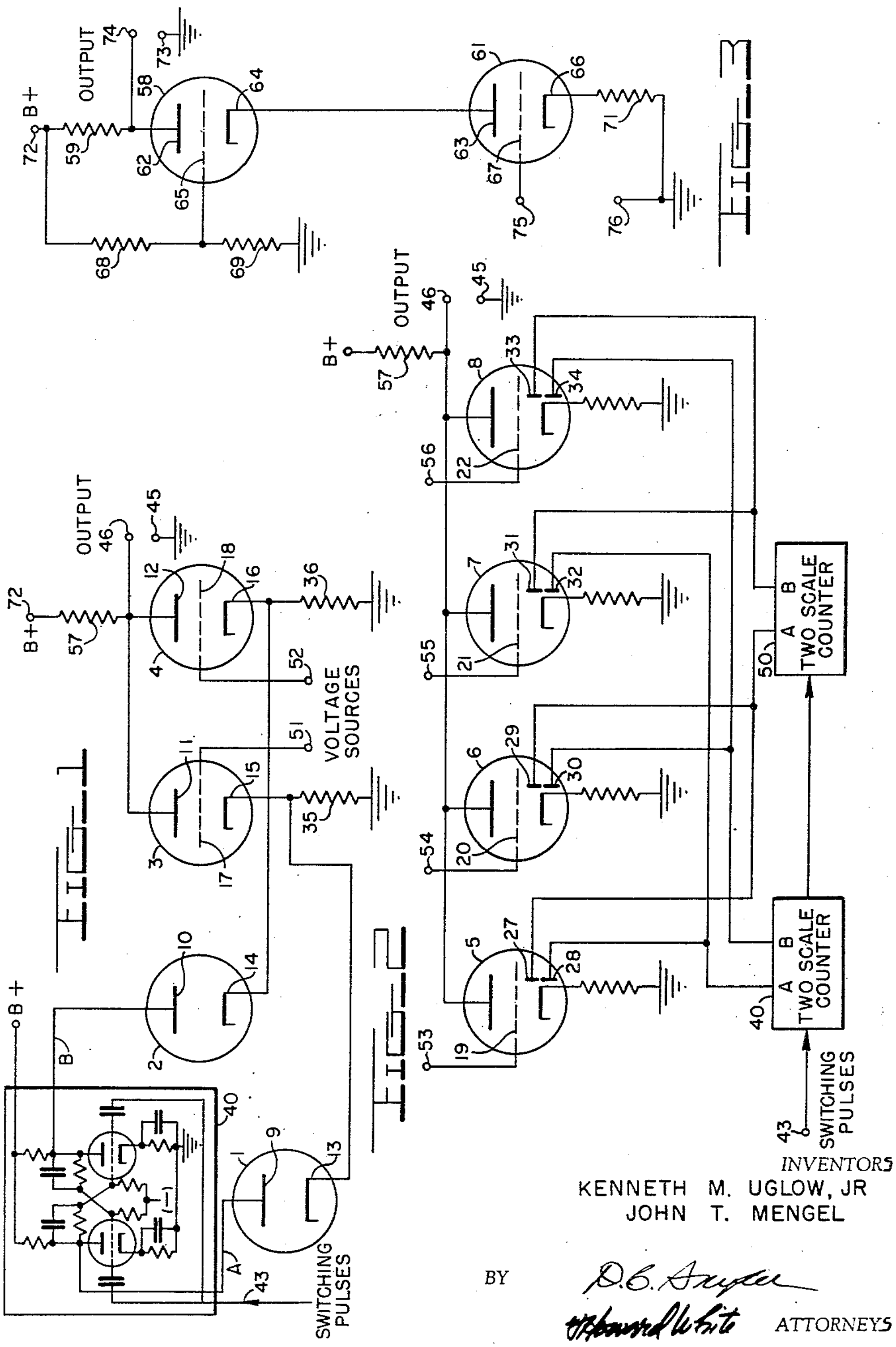
INVENTORS
KENNETH M. UGLOW, JR
JOHN T. MENGEL
BY D. C. Snyder
Howard White
ATTORNEYS Dec. 28, 1954 K. M. UGLOW, JR., ET AL 2,698,382

ELECTRONIC SWITCHING METHOD

Filed March 30, 1951 3 Sheets-Sheet 2

INVENTORS
KENNETH M. UGLOW, JR.
JOHN T. MENGEL

BY

ATTORNEYS

Dec. 28, 1954 K. M. UGLOW, JR., ET AL 2,698,382

ELECTRONIC SWITCHING METHOD

Filed March 30, 1951 3 Sheets-Sheet 3

INVENTORS
KENNETH M. UGLOW, JR.
JOHN T. MENGEL

BY D. E. Snyder
Howard White ATTORNEYS

United States Patent Office 2,698,382

Patented Dec. 28, 1954

2,698,382

ELECTRONIC SWITCHING METHOD

Kenneth M. Uglow, Jr., and John T. Mengel, Silver Spring, Md.

Application March 30, 1951, Serial No. 218,510

7 Claims. (Cl. 250—27)

(Granted under Title 35, U. S. Code (1952), sec. 266)

This invention relates in general to an electronic switch and in particular to improvements in systems for switching several input signals in rapid time sequence to a single device or a single transmission path.

The present invention finds utility in multiplex voltage sampling, measuring, telemetering and communication systems. Examples of such systms are disclosed in U. S. Patent No. 2,457,819 to C. H. Hoeppner; the co-pending application of S. W. Lichtman et al., Serial No. 67,904 filed December 29, 1948; and the co-pending application of W. J. Finney, Serial No. 171,171 filed June 29, 1950.

In the above mentioned systems, and other similar electronic systems, there is generally provided a multiplicity of voltages to be either measured, communicated or transmitted in rapid succession. The present invention is a method and means of electronically switching in rapid time sequence said multiplicity of voltages to be measured, communicated or transmitted.

It is accordingly an object of the present invention to provide method and means of successively communicating a plurality of voltages in rapid time sequence to a single operating device.

A further object of the present invention is to provide new and improved coincidence and amplifying circuits.

Another object of the present invention is to provide a coincidence circuit, operable in conjunction with binary counters or the like, for amplifying a plurality of voltages in rapid time sequence.

Still another object of the present invention is to provide an electronic switch employing a simply designed circuit with a minimum number of vacuum tubes and components.

Other objects and attainments of the present invention will become apparent from the following detailed description when taken in conjunction with the drawings in which:

Fig. 1 is a simple two channel switching amplifier circuit which demonstrates the basic principle underlying the present invention.

Fig. 2 is a four channel switching amplifier circuit which illustrates, in simple form, one embodiment of the present invention.

Fig. 3 is a schematic diagram of a single amplifier circuit as employed in the multi-channel circuits of the preferred embodiments.

Figure 4:
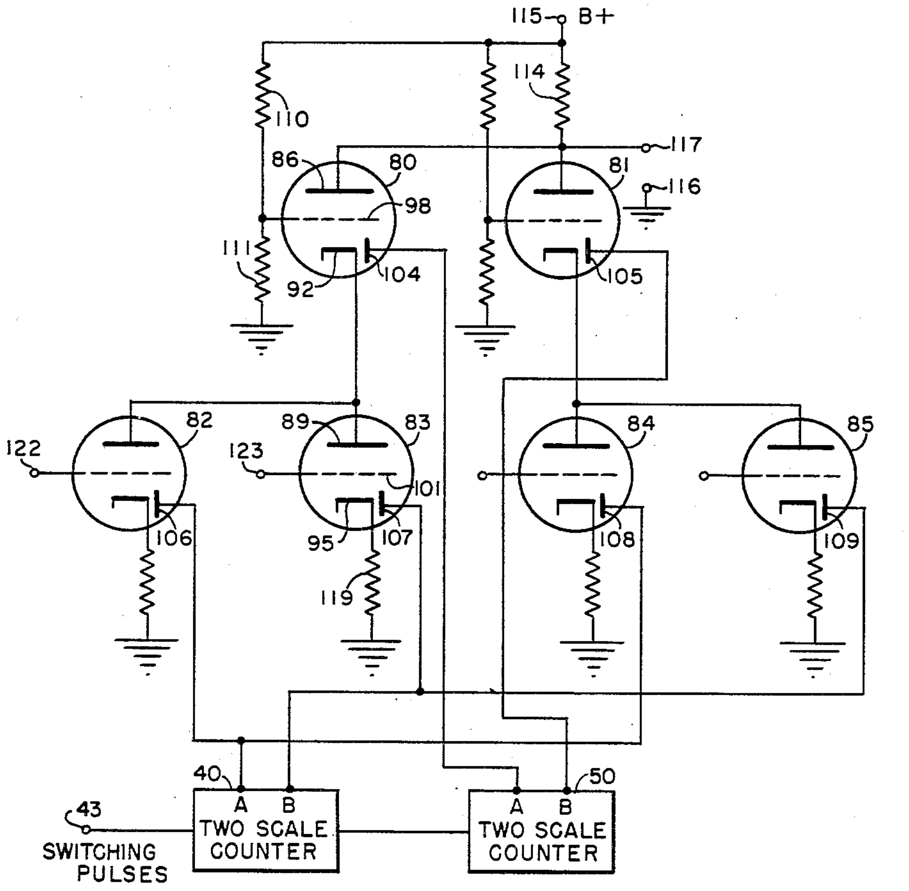
Fig. 4 is a schematic circuit diagram illustrating one preferred embodiment of the present invention.

In accordance with the spirit of the present invention, a binary counter circuit, or the equivalent, is employed wherein a plurality of vacuum tubes are so cross coupled that the conduction states present therein change each time a switching pulse is received; there being a different combination of states for each number of pulses counted. Connected to the output of the various tubes of the counter circuits, as fully described hereinafter, is a plurality of voltage channels each having vacuum tube coincidence and amplifying circuits with the multiplicity of voltages to be switched connected thereto. Through the use of the coincidence circuits, each of the amplifying circuits is maintained inoperative except that one amplifying circuit that is representative of the particular voltage to be presented.

Referring now with more particularity to Fig. 1 there is illustrated an amplifying switching circuit which teaches the basic principle of operation of the preferred embodiments later described in detail. The switching circuit shown in Fig. 1 comprises essentially a plurality of vacuum tubes 1, 2, 3 and 4 and a binary counter circuit 40 having two states, for example, state A wherein a high voltage (preferably positive) appears at terminal A and no, or only a small insignificant voltage, appears at terminal B; and state B wherein the voltage relationship between terminals A and B are reversed. These states may be selectively reversed by the application of suitable switching pulses to terminal 43. The counter circuits shown in the several figures as well as Fig. 1 are conventional and could be an Eccles-Jordan circuit of the type illustrated or any of the various double stability trigger circuits now known to the art.

There is further shown in Fig. 1 a pair of amplifying triode vacuum tubes 3 and 4 having respectively associated therewith a pair of diodes 1 and 2. Cathode 13 of diode 1 is connected directly to cathode 15 of amplifier tube 3 and cathode 14 of diode 2 is tied directly to cathode 16 of triode tube 4. Anodes 11 and 12 of vacuum tubes 3 and 4 jointly receive their plate supply voltage from source of positive potential 72 through a common load resistor 57. The two signals to be amplified in succession are applied to grids 17 and 18 from voltage source terminals 51 and 52 respectively and the output signals are received at output terminals 45 and 46 at the common anode terminal and ground.

When binary counter circuit 40 is in state A, a positive voltage is present at anode 9 of diode vacuum tube 1, permitting vacuum tube 1 to conduct. Cathode 13 of vacuum tube 1, being connected to cathode 15 of vacuum tube 3, causes the output of vacuum tube 1 to appear across resistor 35 tied between cathode 15 and ground. With state A existing, the positive output voltage of vacuum tube 1 appearing across resistor 35 is sufficient to prevent conduction in vacuum tube 3 and thereby block translation of a signal that may be impressed on terminal 51. Since no, or at most a low voltage, is present at point B, when counter 40 is in state A, tube 2 is nonconducting and vacuum tube 4, which is also biased to normally permit conduction, continues to conduct and amplify input signals applied thereto at terminal 52. The amplified voltage appears across output terminals 45 and 46.

Upon application of a switching pulse at terminal 43 the state of the counter circuit 40 reverses and a positive voltage appears at B. This positive voltage is transmitted through vacuum tube 2 to cathode 16 of vacuum tube 4 to cause a positive voltage to appear across resistor 36 connected between cathode 16 and ground. This action blocks conduction in tube 4 and terminates the translation of input signals from terminal 52 to terminals 45, 46.

Since counter 40 is in state B, in this instance, the voltage at point A drops below the cut-off potential of vacuum tube 3 allowing in turn vacuum tube 3 to conduct and perform as a voltage amplifier thereby switching the input signals applied to terminal 51 to the output terminals 45, 46.

It is seen then that every time a switching pulse occurs the state of counter 40 changes and the output voltage at terminals 45, 46 corresponds to the signal voltage applied at either 51 or 52 in dependency upon whether counter 40 is in state A or state B.

In the event that it is desired to switch four amplifying channels in rapid time sequence, two counter stages connected in cascade to form a scale of four counter may be employed in conjunction with diode coincidence circuits as shown in Fig. 2, to which reference may now be had. Fig. 2 shows a four channel switching amplifier comprising essentially vacuum tubes 5 through 8 each having a pair of additional anodes positioned in adjacent relationship to their respective cathodes to provide in each envelope a double-diode-triode in conjunction with two binary counters 40 and 50. It is understood, of course, that separate diode vacuum tubes may be employed rather than incorporating the diodes in a single envelope with the triode amplifiers as shown in Fig. 2. Terminal A of the two scale binary counter 40 is connected to diode-anodes 28 and 32 of the odd numbered vacuum tubes 5 and 7 and terminal B is connected to diode anodes 30 and 34 of the even numbered vacuum tubes 6 and 8. Terminal A of two scale counter 50 is connected to diode-anodes 27 and 29 of the first pair of vacuum tubes 5 and 6 and terminal B is connected to diode-anodes 31 and 33 of the second pair of vacuum tubes 7 and 8. In brief, the circuit of Fig. 2 is operative in such a manner that one of the particular triodes conducts only when both of the diode plates associated therewith are allowed to drop below the cathode voltage at the same time, i. e., in coincidence. If either diode is raised to a positive voltage level the associated triode will cease conduction.

In more detail, the operation of the circuit of Fig. 2 is similar to that of Fig. 1 with the addition of the coincidence circuit. When the two scale counter 50, in series with two scale counter 40 forming a scale of four counter, is in state A the first pair of vacuum tubes 5 and 6 are cut off, since the positive potential from binary counter 50 is applied to anode 27 of vacuum tube 5 and anode 29 of vacuum tube 6. With vacuum tubes 5 and 6 non-conductive either vacuum tube 7 or 8 will be conductive depending upon the state of counter 40. The positive voltage from state A of counter 40 being applied to anode 32 of vacuum 7 when counter 40 is in state A and the positive voltage from state B of counter 40 being applied to anode 34 of vacuum tube 8 when counter 40 is in state B, prevents conduction in either vacuum tube 7 or 8 dependent on the state of counter 40. The voltage at output terminals 45 and 46 across resistor 57 accordingly will be dependent upon either the source voltage signals applied to input terminals 55 or 56 tied to grids 21 and 22 respectively.

On the reception of a switching pulse from terminal 43, assuming the state of the counter circuit 50 reverses, then the positive voltage output from state B of counter 50 is applied to anodes 31 and 33 to prevent conduction in the second pair of vacuum tubes 7 and 8 and to again permit one of the vacuum tubes 5 and 6 to conduct. The output from state A of counter 40 being tied to anode 28 will prevent conduction in vacuum tube 5 if counter 40 is in state A and the output from state B of counter 40, being tied to anode 30, will prevent conduction in vacuum tube 6 if counter 40 is in state B. Accordingly, with vacuum tubes 7 and 8 non-conductive, either vacuum tube 5 or 6 will be conductive depending upon the state of counter 40, to amplify either the source voltage at terminals 53 or 54 applied to grids 19 and 20 respectively.

The circuit shown in Fig. 2 can be extended to include any number of channels, but will require as many diodes in each channel as there are counter stages; as per example, a switching amplifier for sixteen channels will require four diodes per channel. This exceedingly large number of diodes, of course, imposes a serious limitation on the extension of the circuit of Fig. 2. The present invention, however, further teaches means for extending the principle of Fig. 2 without requiring as many diodes for a large number of channels. There is shown in Fig. 4 a four channel switching wherein the number of diodes is reduced from what would be necessary in merely extending the circuit of Fig. 2 to include four channels. This is made possible by the use of the unique amplifier circuit of Fig. 3 to which reference may now be had.

In the amplifier circuit of Fig. 3, grid 65 of vacuum tube 58 is connected to a junction point of resistive elements 68 and 69 forming a voltage divider network between the point of positive potential 72 and ground for supplying a constant bias voltage to grid 65. Anode 62 receives its plate supply from source of positive potential 72 through load resistor 59. The voltage at grid 65 is approximately equal to the voltage at anode 63. Cathode 64 of vacuum tube 58 is tied directly to anode 63 of a second vacuum tube 61. The cathode 66 of vacuum tube 61 is tied to ground through resistor 71. The voltage to be amplified is applied over input terminals 75 and 76 to grid 67 and the amplified voltage output is taken at terminals 73 and 74 tied between ground and anode 62.

In theory of operation of the amplifying circuit of Fig. 3, each vacuum tube 58 and 61 acts as a cathode loaded circuit; vacuum tube 58 having as its cathode load tube 61 and resistor 71 and vacuum tube 61 also having as its load resistor 71. Since each of the vacuum tubes are similarly connected, a two switch point series path is provided and an input signal coupled to input terminals 75—76 may be blocked from output terminals 73—74 by blocking either of the two vacuum tubes 58 or 61.

An embodiment of a switching amplifier incorporating the amplifier of Fig. 3 is illustrated in Fig. 4 to which reference may again be had. Vacuum tube 80, with either vacuum tube 82 or 83, and vacuum tube 81, with either vacuum tube 84 or 85, form amplifying circuits substantially as that shown in Fig. 3. Also in Fig. 4 the particular amplifying vacuum tubes have diodes associated therewith to further form coincidence circuits as formerly described in conjunction with Fig. 2. The scale of two counter 40 has the output from the terminal A tied to the odd numbered tubes by way of anode 106 of vacuum tube 82 and anode 108 of vacuum tube 84; and the output of terminal B is tied to the even numbered tubes by way of anode 107 of vacuum tube 83 and anode 109 of vacuum tube 85. Unlike the previous embodiments, however, the A and B terminals of the scale of two counter 50 are not tied to a second additional anode but are applied to separate anodes 104 and 105 of vacuum tubes 80 and 81 respectively.

In the amplifying circuits of Fig. 4, vacuum tube 80 with either vacuum tube 83 or 82, and vacuum tube 81, with either vacuum tube 84 or 85, are connected in manner similar to the circuit shown in Fig. 3 wherein, taking vacuum tubes 80 and 83 for example, resistive elements 110 and 111 form a voltage divider network between point of positive potential 115 and ground for supplying a constant bias voltage to grid 98 of vacuum tube 80. The voltage of grid 98 being approximately equal to the voltage at anode 89 supplied by load resistor 114 from B+ potential source 115. Cathode 92 is tied directly to anode 89 of vacuum tube 83 and cathode 95 of vacuum tube 83 is tied to ground through load resistor 119. Accordingly, vacuum tubes 80—82 and 80—83 form a pair of two switch point circuits and since each amplifying circuit is serially connected a signal at either input terminal 122 or 123 will be blocked from output terminals 116, 117 if the respective amplifying circuit is blocked at either point.

In operation of the circuit of Fig. 4 the positive pulse output from terminal A of counter 50 is applied to anode 104 of vacuum tube 80 to render vacuum tube amplifying circuits 80—82 and 80—83 inoperative when counter 50 is in state A. Either, amplifying circuit 81—84, having the output of state A of counter 40 connected to anode 108 of vacuum tube 84, or 81—85, having the output of state B of counter 40 connected to anode 109 of vacuum tube 85, will be operative depending on the state of counter 40. The positive output from state B of counter 50 is applied to anode 105 of vacuum tube 81 to render vacuum tube amplifying circuits 81—84 and 81—85 inoperative when counter 50 is in state B. Either amplifying circuit 80—82, having the output of state A of counter 40 connected to anode 106 of vacuum tube 82, or 80—83, having the output of state B of counter 40 connected to anode 107 of vacuum tube 83, will be operative depending on the state of counter 40.

The circuit shown in Fig. 4 can conveniently be expanded to eight channels for presenting eight signals in rapid time sequence by adding an additional scale of two counter stage in cascade and using two groups of vacuum tubes as shown in Fig. 4 with additional diode gated tubes connected above the anode connections of vacuum tubes 80 and 81 to select alternately between groups determined by the cascaded scale of two counter stages.

Figure 5:
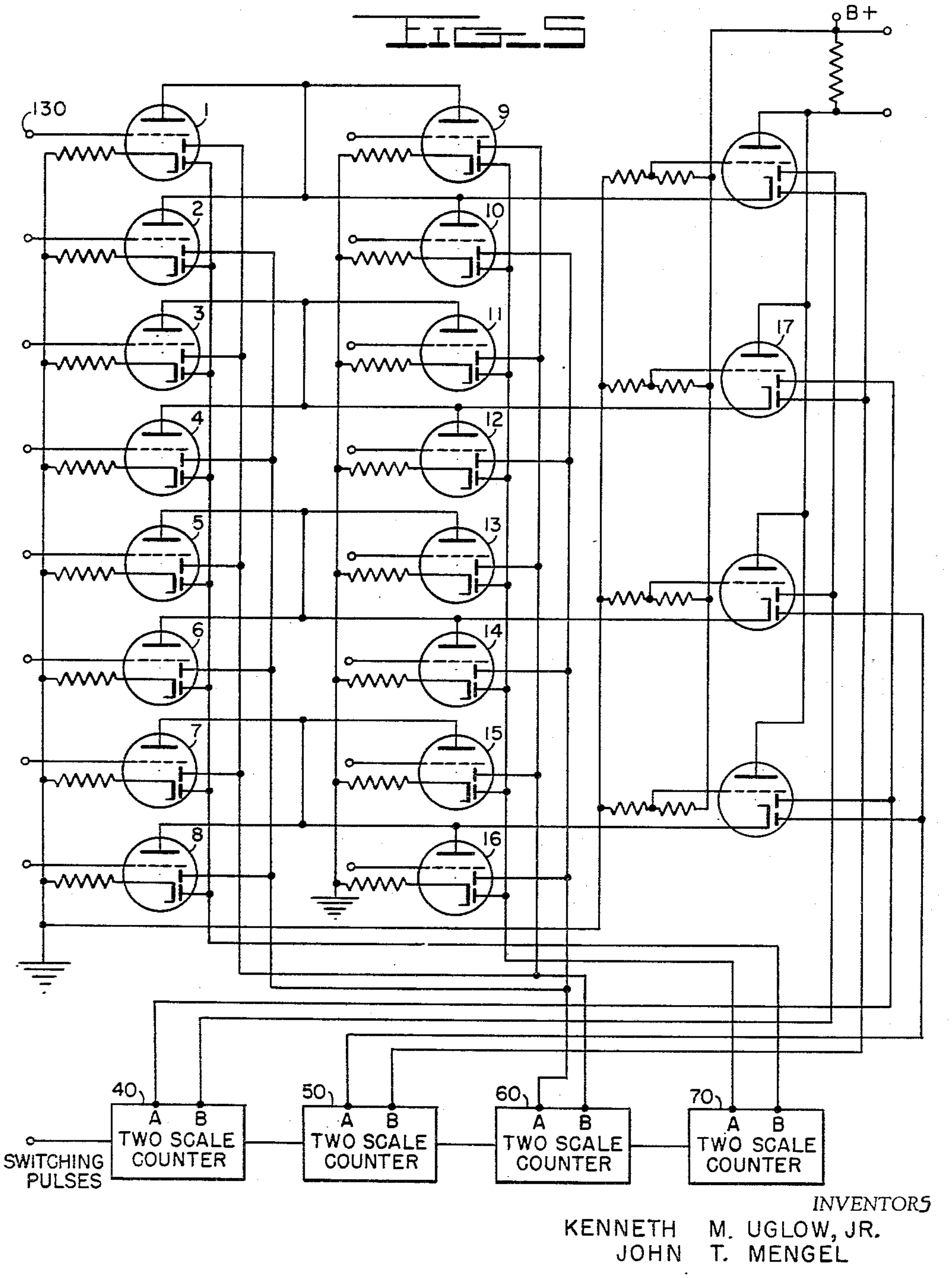
Fig. 5 is a schematic circuit diagram illustrating another preferred embodiment of the present invention.

A sixteen channel switching amplifier illustrating further expansion is shown in Fig. 5 using additional diodes and multiple coincidence gating of both upper and lower tubes. The operation of the circuit of Fig. 5 is similar to the amplifying circuits of Fig. 4 in combination with the double diode coincidence circuit described in conjunction with Fig. 2. As per example, vacuum tube 17 forms an amplifying circuit, as that described in Fig. 3, in combination with either of vacuum tubes 3, 4, 11 or 12. In a similar manner each of the other tubes in the bank of four shown at the right in this figure is connected in series with four tubes in the bank numbers 1 to 16. Each of the vacuum tube circuits 1 through 16 have a pair of additional diodes to maintain them inoperative for a particular state of the various scale of two binary counter circuits.

In more particular, terminal B of the last counter stage 70 is connected to the anode of one of the diode sections of each of the first eight tubes 1 to 8, and terminal A is connected to the anode of the diode sections of each of the eight tubes 9 to 16. Thus counter stage 70 operates to divide the amplifying tubes into two equal groups of tubes 1 to 8 and 9 to 16 respectively. The state of this counter stage thus determines in which group conduction can occur. Terminal B of the third counter stage 60 is connected to one of the anodes of each of the odd numbered tubes in both of the aforementioned groups, and terminal A is connected to all the even numbered tubes in both groups. Thus the state of this counter determines whether an odd or an even numbered tube can conduct. Continuing, terminal B of the second counter stage 50 is connected to the anode of one diode section in each of the first two tubes of the bank of four, and terminal A is connected to the anode of one diode section in each of the last two tubes in this bank. Thus the state of this counter stage determines whether the first four tubes in a group of eight (a half group) or the last four in the group can conduct. Terminal B of the first counter stage 40 is connected to the anode of one diode section of each of the odd tubes in the bank of four and terminal A is connected to the even numbered tubes in this bank. Thus the state of this stage determines whether the first pair or last pair in the half groups can conduct.

To illustrate the operation of the circuit of Fig. 5, assume the two scale counter 70 is in state B; in this condition it will be seen that the vacuum tubes 1 through 8 will receive a positive voltage to render them non-conductive. Accordingly, one of the tubes of 9 through 16 will be conductive depending on the state of the other counters. Assume also that the two scale counter 60 is in state B; it will be seen that vacuum tubes 9, 11, 13 and 15 will also be rendered non-conductive, leaving 10, 12, 14 and 16 to conduct in dependency on the state of counters 40 and 50. Now assume the scale of two counter 50 is in state A; it will be seen that 14 and 16 are now eliminated leaving vacuum tube 10 or 12 to conduct in dependency on the state of the scale of two counter 40.

Although certain and specific embodiments have been shown and described it is to be understood that they are merely illustrative and modifications may, of course, be made therefrom without departing from the true spirit and scope of the invention.

The invention described herein may be manufactured and used by or for the Government of the United States of America for governmental purposes without the payment of any royalties thereon or therefor.

What is claimed is:

1. An electronic switch for amplifying in rapid time sequence a multiplicity of signals comprising: a first series of vacuum tubes each having an anode, a cathode, and a control electrode, means for coupling each of said multiplicity of signals to the control electrode of a corresponding tube in said first series, means for connecting the anodes of said first series of tubes together in groups, a second series of vacuum tubes corresponding in number to said groups each having an anode, cathode, and control electrode, means for connecting the anodes of the tubes forming each of said groups to the cathode of a respective one of said second series of tubes to form a plurality of amplifying circuits, a plurality of scale of two trigger stages coupled together in cascade to form a counter chain, means coupling each of said amplifier circuits to said stages in the chain to establish conduction in a different amplifier circuit for each state of the counter chain.

2. An electronic switch for amplifying in rapid time sequence a multiplicity of signals comprising: a first series of vacuum tubes each having an anode, a cathode, and a control electrode, means for coupling each of said multiplicity of signals to the control electrodes of a corresponding tube of said first series, means for connecting the anodes of said first series of tubes together in groups, a second series of vacuum tubes corresponding in number to said groups each having an anode, cathode and control electrode, means for connecting the anodes of the tubes forming each of said groups to the cathodes of a respective one of said second series of tubes to form a plurality of amplifying circuits, a plurality of scale-of-two trigger stages coupled in cascade to form a counter chain, unilateral impedance means coupling each of said amplifier circuits to said stages in the chain to permit conduction in a different amplifier circuit one at a time, the particular amplifier permitted to conduct dependent on the state of said counter chain, and means for connecting switching pulses to said chain to alter the state thereof.

3. An electronic switch for amplifying in rapid time sequence a multiplicity of signals comprising: a first series of vacuum tubes each having at least an anode, a cathode, and a control electrode, means for coupling each of said multiplicity of signals to the control electrodes of a corresponding tube in said first series, means for connecting the anodes of said first series of tubes in groups, a second series of vacuum tubes corresponding in number to said groups each having an anode, a cathode, and a control electrode, means connecting the anodes forming each of said groups to the cathodes of a respective one of said second series of tubes to form a plurality of amplifying circuits, a plurality of scale of two trigger stages coupled together in cascade to form a counter chain, means coupling each of said amplifier circuits to said chain, means for changing the cathode-grid bias on said first and second series of vacuum tubes to establish conduction in a different amplifier circuit for each state of the counter chain, and means for connecting switching pulses to said chain to alter the state thereof.

4. An electronic switch for amplifying in rapid time sequence a multiplicity of signals comprising: a first series of vacuum tubes each having at least an anode, a cathode, and a control electrode, means coupling each of said multiplicity of signals to the control electrode of a corresponding tube in said first series, means connecting the anodes of said first series in groups, a second series of vacuum tubes corresponding in number to said groups each having an anode, a cathode, and a control electrode, means connecting the anodes forming each of said groups to the cathodes of a respective one of said second series of tubes to form a plurality of amplifying circuits, a plurality of scale-of-two trigger stages coupled together in cascade to form a counter chain, means coupling each of said amplifier circuits to said chain, means for changing the cathode voltage of said first and second series of vacuum tubes to establish conduction in a different amplifier circuit for each state of the counter chain, and means for connecting switching pulses to said chain to alter the state thereof.

5. An electronic switch substantially as set forth in claim 1 wherein the means coupling each of said amplifier circuits to said stages in the chain comprises a third series of vacuum tubes in number equal to at least the sum of said first and second series of vacuum tubes, each having at least an anode and cathode, and means for coupling each of said anodes to the cathodes of a respective tube in said first series.

6. An electronic switch comprising: first and second vacuum tubes each having anode, cathode and control electrodes, means connecting the plate of said first vacuum tube to the cathode of said second vacuum tube, a load impedance and the source of operating potential connected in series with the anode-cathode space current path of said tubes, a signal input connection to the control electrode of said first vacuum tube, means supplying a constant bias voltage to the control electrode of said second vacuum tube, and a control circuit including first and second control terminals coupled respectively to said cathodes of said first and second vacuum tubes to control the conduction thereof.

7. An electronic switch comprising: first and second vacuum tubes each having anode, cathode and control electrodes, means connecting the plate of said first vacuum tube to the cathode of said second vacuum tube, a load impedance and the source of operating potential connected in series with the anode-cathode space current path of said tubes, a signal input connection to the control electrode of said first vacuum tube, means supplying a constant bias voltage to the control electrode of said second vacuum tube, and a control circuit including a unilateral impedance element coupled to the cathode of each of said tubes to control the conduction of said tubes.

References Cited in the file of this patent

UNITED STATES PATENTS

| Number | Name | Date |
|---|---|---|
| 2,300,999 | Williams | Nov. 3, 1942 |
| 2,557,644 | Forbes | June 19, 1951 |
| 2,559,499 | Gillette et al. | July 3, 1951 |
| 2,562,530 | Dickinson | July 31, 1951 |
| 2,586,151 | Costello | Feb. 19, 1952 |